United States Patent
Franke

(10) Patent No.: US 12,420,726 B2
(45) Date of Patent: Sep. 23, 2025

(54) ELECTRICAL ENERGY STORE HAVING A DISTRIBUTION NETWORK, AND MOTOR VEHICLE

(71) Applicant: Bayerische Motoren Werke Aktiengesellschaft, Munich (DE)

(72) Inventor: Torsten Franke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 24 days.

(21) Appl. No.: 18/287,674

(22) PCT Filed: May 23, 2022

(86) PCT No.: PCT/EP2022/063889
§ 371 (c)(1),
(2) Date: Oct. 20, 2023

(87) PCT Pub. No.: WO2022/268423
PCT Pub. Date: Dec. 29, 2022

(65) Prior Publication Data
US 2024/0181979 A1    Jun. 6, 2024

(30) Foreign Application Priority Data
Jun. 22, 2021    (DE) .................. 10 2021 116 056.1

(51) Int. Cl.
*B60R 16/023*    (2006.01)
*B60L 50/60*    (2019.01)
(Continued)

(52) U.S. Cl.
CPC .......... *B60R 16/0231* (2013.01); *B60L 50/60* (2019.02); *B60R 16/033* (2013.01); *H01M 50/204* (2021.01); *H01M 2220/20* (2013.01)

(58) Field of Classification Search
CPC ... B60R 16/0231; B60R 16/033; B60L 50/60; H01M 50/204; H01M 2220/20
(Continued)

(56) References Cited

U.S. PATENT DOCUMENTS

| | | | | |
|---|---|---|---|---|
| 2012/0003515 A1* | 1/2012 | Eisenhour | ......... | H01M 10/6571 429/62 |
| 2016/0049706 A1* | 2/2016 | Kerspe | .............. | H01M 10/6555 429/120 |
| 2016/0188082 A1* | 6/2016 | Ham | ................... | G02F 1/13338 345/173 |

FOREIGN PATENT DOCUMENTS

| | | |
|---|---|---|
| DE | 10 2009 037 012 A1 | 2/2011 |
| DE | 10 2014 111 645 A1 | 2/2016 |

(Continued)

OTHER PUBLICATIONS

International Search Report (PCT/ISA/210) issued in PCT Application No. PCT/EP2022/063889 dated Nov. 9, 2022 with English translation (5 pages).
(Continued)

*Primary Examiner* — Rexford N Barnie
*Assistant Examiner* — Swarna N Chowdhuri
(74) *Attorney, Agent, or Firm* — Crowell & Moring LLP

(57) ABSTRACT

An electrical energy store for a motor vehicle includes a plurality of components belonging to the energy store, a store housing on and/or in which the components belonging to the energy store are arranged, and at least one distribution network for distributing substances and/or energy and/or information, which distribution network is arranged in the store housing and has at least one line which belongs to the energy store and, for the purpose of transferring substances and/or energy and/or information, is coupled to at least one of the components belonging to the energy store, wherein the at least one distribution network has at least one line that
(Continued)

is extraneous to the energy store and is intended to transfer substances and/or energy and/or information between components of the motor vehicle that are extraneous to the energy store and are outside the store housing.

5 Claims, 2 Drawing Sheets

(51) Int. Cl.
*B60R 16/033* (2006.01)
*H01M 50/204* (2021.01)

(58) Field of Classification Search
USPC ........................................................ 307/10.1
See application file for complete search history.

(56) References Cited

FOREIGN PATENT DOCUMENTS

| DE | 10 2014 215 164 A1 | 2/2016 |
|----|---------------------|--------|
| DE | 10 2018 215580 A1 | 3/2020 |
| DE | 10 2019 213 674 B3 | 12/2020 |
| JP | 5-208617 A | 8/1993 |
| WO | WO 2022/207208 A1 | 10/2022 |

OTHER PUBLICATIONS

German-language Written Opinion (PCT/ISA/237) issued in PCT Application No. PCT/EP2022/063889 dated Nov. 9, 2022 with English translation (9 pages).
German Search Report issued in German Application No. 10 2021 116 056.1 dated Jun. 9, 2022 with partial English translation (13 pages).

* cited by examiner

ELECTRICAL ENERGY STORE HAVING A DISTRIBUTION NETWORK, AND MOTOR VEHICLE

BACKGROUND AND SUMMARY

The invention relates to an electrical energy storage unit for a motor vehicle, having a plurality of components belonging to the energy storage unit and a storage unit housing, on and/or in which the components belonging to the energy storage unit are arranged. The electrical energy storage unit furthermore has at least one distribution network, for distributing materials and/or energy and/or information, which is arranged in the storage unit housing and which has at least one line, which is belonging to the energy storage unit and is coupled to at least one of the components belonging to the energy storage unit so as to transmit materials and/or energy and/or information. The invention furthermore relates to a motor vehicle.

At present, interest is focused on electrical energy storage units that can be used, for example, as traction batteries for electrified motor vehicles, that is to say electric vehicles or hybrid vehicles. Electrical energy storage units of this kind usually have a plurality of components belonging to the energy storage unit, for example, energy storage cells, control devices, sensor devices, etc. These components belonging to the energy storage unit are usually arranged in or on a storage unit housing of the electrical energy storage unit. By way of example, the electrical energy storage unit can be arranged in the area of a vehicle floor of the motor vehicle and can be strengthened for side crash loads by way of reinforcements on the motor vehicle or the storage unit housing. The freedom of design of these measures is restricted by lines running between the vehicle front end and the vehicle rear end. These lines are generally arranged between the electrical energy storage unit and a side structure of the motor vehicle on account of the central arrangement of the electrical energy storage unit. In particular, lines that carry relatively high voltages or flammable liquids, or else should continue to be functional following a vehicle crash, have to be afforded separate protection against the crash loads. As a result, the width of the energy storage unit is limited by these lines and extra effort is needed to reinforce the side structure of the vehicle or the lines. This increases both the costs and the weight of the motor vehicle.

The object of the present invention is to provide a weight-reducing and cost-reducing solution for protecting lines of the motor vehicle against crash loads.

This object is achieved according to the invention by an electrical energy storage unit and a motor vehicle having the features according to the respective independent patent claims. The dependent patent claims, the description and the figures relate to advantageous embodiments of the invention.

An electrical energy storage unit, according to the invention, for a motor vehicle has a plurality of components belonging to the energy storage unit and a storage unit housing, on and/or in which the components belonging to the energy storage unit are arranged. The electrical energy storage unit furthermore has at least one distribution network, for distributing materials and/or energy and/or information, which is arranged in the storage unit housing and which has at least one line, which belongs to the energy storage unit, for transmitting materials and/or energy and/or information, which line is coupled to at least one of the components belonging to the energy storage unit. Furthermore, the at least one distribution network has at least one line, separate from the energy storage unit, for transmitting materials and/or energy and/or information between components, which are separate from the energy storage unit, of the motor vehicle outside of the storage unit housing.

A motor vehicle according to the invention comprises an electrical energy storage unit according to the invention and at least two components, which are separate from the energy storage unit and are coupled by means of the at least one line, which is separate from the energy storage unit and integrated into the at least one distribution network. The components separate from the energy storage unit can be a drive of the motor vehicle, a refrigerant compressor, a brake system or the like, for example. The electrical energy storage unit is in particular arranged in the area of an underbody of the motor vehicle, for example, centrally between a vehicle front end and a vehicle rear end.

The electrical energy storage unit has components belonging to the energy storage unit, or energy storage unit components. Energy storage unit components of this kind can be energy storage cells, for example, round cells, prismatic cells or pouch cells, which are stacked and interconnected to form at least one cell assembly. Energy storage unit components of this kind can also be cell-specific devices, which can have sensors and actuators for monitoring the energy storage cells. The energy storage unit components can also be control units that are coupled to the cell-specific devices, for example.

The energy storage unit components are arranged in and/or on the storage unit housing. By way of example, the storage unit housing can have two housing parts in the form of a housing lower part and a housing upper part, which are mechanically connected to form a housing interior for accommodating the energy storage unit components. Furthermore, at least one distribution network that can have a plurality of lines belonging to the energy storage unit is arranged in the storage unit housing. By way of example, the lines belonging to the energy storage unit can couple the energy storage unit components to one another and/or couple at least one energy storage unit component to a component separate from the energy storage unit outside of the storage unit housing.

The storage unit housing can have crash structures and/or can be surrounded by crash structures of the vehicle, which are configured to absorb an accident-induced force acting on the electrical energy storage unit and to keep it away from the energy storage unit components. In order to be able to advantageously make joint use of these crash structures for lines separate from the energy storage unit, these lines separate from the energy storage unit are integrated into the at least one distribution network and therefore likewise arranged in the storage unit housing. The lines separate from the energy storage unit are therefore not guided past the electrical energy storage unit, but rather through the storage unit housing. By way of example, the lines separate from the energy storage unit are used to couple components, which are separate from the energy storage unit, of the motor vehicle, between which the electrical energy storage unit is arranged. By way of example, the storage unit housing can have bushings or connections, to which a portion, which is internal to the storage unit housing, of the at least one line separate from the energy storage unit is connected, and to which a portion, which is external to the storage unit housing, of the at least one line separate from the energy storage unit is able to be connected. This makes it possible for the lines separate from the energy storage unit to connect a component, which is separate from the energy storage unit and arranged upstream of the electrical energy storage unit in the vehicle front end, to a component, which is separate from the energy storage unit and arranged downstream of the electrical energy storage unit in the vehicle rear end.

In particular, at least one of the housing parts is of multi-walled design, wherein the at least one distribution network is integrated into the at least one multi-walled housing part. By way of example, the multi-walled housing part can be of two-walled or three-layered design, such that at least one interspace running within the housing part is formed. The at least one distribution network can be integrated into this at least one interspace.

According to one embodiment of the invention, the at least one distribution network is in the form of a fluid conduction system for distributing materials in the form of fluids. To this end, the multi-walled housing part has at least one first channel-like interspace through which the at least one line, which belongs to the energy storage unit and conducts fluid, is formed, and at least one second channel-like interspace through which the at least one line, which is separate from the energy storage unit and conducts fluid, is formed. According to this embodiment, the multi-walled housing part, for example, the housing upper part, forms the at least one distribution network by virtue of it having the channel-like or tube-like interspaces for conducting the fluid. The interspaces therefore form the lines, by means of which a fluid can be conducted. By way of example, the fluid can be a temperature-control fluid or a heat-transport medium for controlling the temperature of the components belonging to the energy storage unit and/or separate from the energy storage unit. It can also be the case, however, that materials or fluids having different functions are conducted in the interspaces. By way of example, the fluid conducted in the first interspace can be a temperature-control fluid for controlling the temperature of the energy storage unit components and the fluid conducted in the second interspace can be a brake fluid for a component, which is separate from the energy storage unit, in the form of a brake system of the motor vehicle.

In a further embodiment, the at least one distribution network can be in the form of a communication network for transmitting information in the form of monitoring signals and/or control signals. To this end, for example, the lines belonging to the energy storage unit can connect the cell-specific devices of the energy storage cells to one another and/or to a control unit of the energy storage unit and/or to a control unit external to the energy storage unit in order to monitor the energy storage cells. The lines separate from the energy storage unit can be integrated into this communication network that is internal to the storage unit, and for example, can transmit control signals and/or information signals between the vehicle front end and the vehicle rear end.

Provision can be made for the communication network to be in the form of a waveguide that is configured to transmit acoustic and/or optical signals as the monitoring signals and/or control signals. In particular, the waveguide is in the form of a single-piece molded part.

The single-part molded part can have a plurality of molded part portions, for example, at least one collector channel and connection channels connected thereto, wherein the collector channel can be coupled to a control unit of the energy storage unit and the connection channels to the cell-specific devices of the energy storage cells. In this case, the molded part is a finished part that can be integrated into the storage unit housing with just one installation step. The molded part therefore does not consist of individual parts that have to be connected or wired up to one another, but rather already provides a single-part communication network or transmission network, for example, in the form of a bus topology, in order to transmit signals. For the arrangement of the molded part, the connection channels are arranged at the cell-specific devices of the energy storage unit components and the at least one collector channel is arranged at the at least one control unit, for example.

In order to communicate with the control unit, a device of an energy storage cell couples an optical and/or acoustic signal into the associated connection channel, which signal is transmitted via the connection channel and the collector channel and is coupled out again at the collector channel. In order to communicate with an energy storage cell, the control unit couples an optical and/or acoustic signal into the collector channel, which signal is transmitted via the collector channel and the connection channel and is coupled out again at the connection channel of the respective energy storage cell. The collector channel and the connection channels therefore form the lines belonging to the energy storage unit in order to transmit information. By way of example, each energy storage unit component can in this case be assigned a specific wavelength or a corresponding signal band of the electromagnetic wave and/or sound wave. The energy storage unit components can have transmitting and receiving elements in order to generate signals and to receive signals. In the case of optical signals, the transmitting elements are LEDs, for example, and the receiving elements are photodetectors. In the case of acoustic signals, the transmitting elements are loudspeakers, for example, and the receiving elements are microphones. The molded part additionally has at least one further molded part portion that forms the at least one line separate from the energy storage unit. The at least one further molded part portion can be formed parallel to the collector channel, for example.

By way of example, the molded part can be in the form of a hollow body in which the signal is transmitted by means of reflection on inner sides of walls of the hollow body. A molded part of this kind can be a tube system. The molded part is particularly preferably in the form of a solid body that has first surface structures for signal in-coupling and signal out-coupling for the components belonging to the energy storage unit, and second surface structures for signal in-coupling and signal out-coupling for the components separate from the energy storage unit. The surface structures therefore form signal inputs and signal outputs with respect to the associated molded part portions, which in turn form the lines separate from the energy storage unit and belonging to the energy storage unit. By way of example, the second surface structures can be coupled to the connections of the storage unit housing, which in turn are able to be coupled to the portions, which are external to the energy storage unit, of the line separate from the energy storage unit.

The solid body is in particular manufactured from a plastic, for example, polyacrylic. The molded part is preferably in the form of an injection molded part. By way of example, surfaces of the solid body can be ground or etched in some areas to form the surface structure, in order to form the areas for signal in-coupling and signal out-coupling. A molded part of this kind can be manufactured in a particularly simple and cost-effective manner. The molded part can also have a coating made of a reflective material at least in some areas to reduce damping of the acoustic and/or optical signal. A coating of this kind is applied away from the areas provided for signal in-coupling and signal out-coupling. The coating can be a metallization, for example.

In a further embodiment of the invention, the at least one distribution network is in the form of a power network for energy transmission, wherein the power network is arranged in and/or on a cell module frame of components, which belong to the energy storage unit and are in the form of energy storage cells. By way of example, the power network can be integrated into a cell contacting system, for interconnecting the energy storage cells, which in turn is integrated into the cell module frame. By way of example, the power network or energy transmission network can have power lines, which belong to the energy storage unit and connect connections of the cell assembly to a power connection of the electrical energy storage unit that is able to be connected to power electronics of a drive of the motor vehicle, for example. The power network furthermore has at least one power line, which is separate from the energy storage unit and via which energy is able to be transmitted through the storage unit housing between the components, which are separate from the energy storage unit, of the motor vehicle.

The embodiments presented with respect to the electrical energy storage unit according to the invention and their advantages accordingly apply to the motor vehicle according to the invention.

Further features of the invention emerge from the claims, the figures and the description of the figures. The features and combinations of features mentioned above in the description and the features and combinations of features mentioned below in the description of the figures and/or shown only in the figures are able to be used not only in the respectively stated combination, but also in other combinations or alone.

The invention is now explained in more detail on the basis of a preferred exemplary embodiment and with reference to the drawings, in which:

DETAILED DESCRIPTION OF THE DRAWINGS

In the figures, identical or functionally identical elements are provided with the same reference signs.

Figure 1:
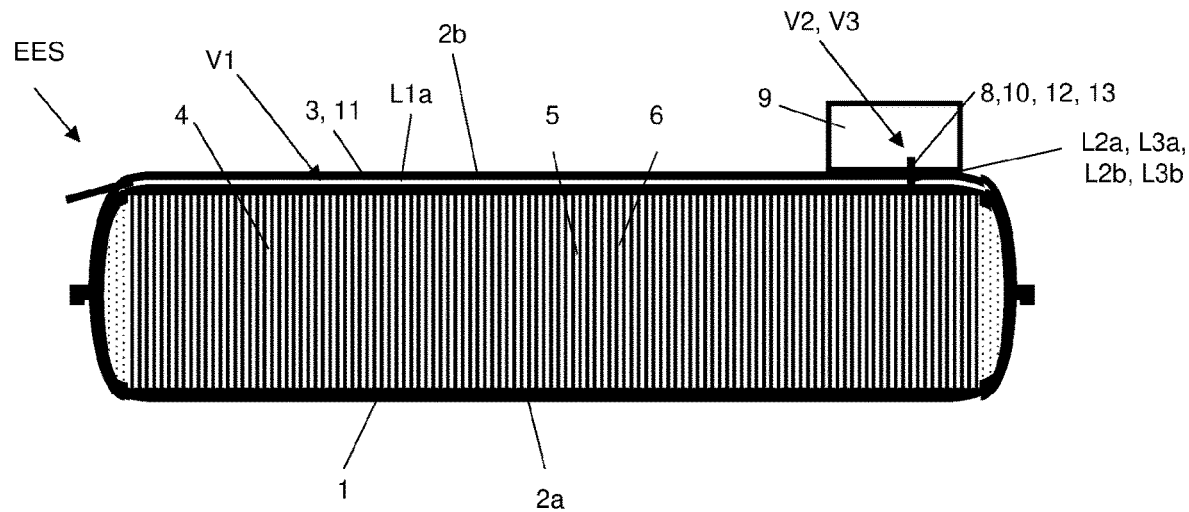
FIG. 1 shows a schematic sectional illustration from the side of an electrical energy storage unit.

FIG. 1 shows an electrical energy storage unit EES that has a storage unit housing 1 with a first housing part 2a in the form of a housing lower part and a second housing part 2b in the form of a housing upper part. The electrical energy storage unit EES can, for example, be used as a traction battery for an electrically drivable motor vehicle and can be in the form of a high-voltage energy storage unit. The housing upper part 2b can be of multi-layered design and can contain at least one channel-like first interspace 3 for a flowing temperature-control fluid, for example a cooling fluid. The first interspace 3 can be connected to an outer cooling circuit via connections. Components belonging to the energy storage unit are arranged between the housing lower part 2a and the housing upper part 2b in the storage unit housing 1. Components of this kind that belong to the energy storage unit can be energy storage cells 6 that are stacked to form at least one cell assembly 4 and arranged in a frame 5. The energy storage cells 6 are interconnected or electrically connected by way of a cell contacting system 7. The components belonging to the energy storage unit can be temperature-controlled, for example, cooled, by way of the temperature-control fluid flowing in the first interspace 3. The first interspace 3 is therefore a first line L1a, which belongs to the energy storage unit and transmits fluid, of a first distribution network V1 in the form of a fluid distribution system.

The cell assembly 4 can be connected to control devices 9 that in this case are in the form of components, which belong to the energy storage unit and are arranged outside on the storage unit housing 1, by way of power connections 8. By way of example, the power connections 8 can be formed from insulated flat conductors that connect contacts of the cell assembly 4 to contacts outside of the cell assembly 4. In this case, the flat conductors can be of single-layered or multi-layered configuration. The line connections 8 are therefore second lines L2a, which belong to the energy storage unit and transmit energy, of a second distribution network V2 in the form of a power network.

The cell assembly 4 can also be connected to the control devices 9 by way of sense connections 10. By way of example, the sense connections 10 are electrical connections or waveguides that connect sensors of the cell assembly 4 to connections outside of the cell assembly 4 in order to monitor the energy storage cells 6. The sense connections 10 are therefore third lines L3a, which belong to the energy storage unit and transmit information, of a third distribution network V3 in the form of a communication network. The power connections 8 and the sense connections 10 are in particular configured in such a way that a fixed connection of the frame 5 to the second housing part 2b and a large line cross section are guaranteed.

Figure 2:
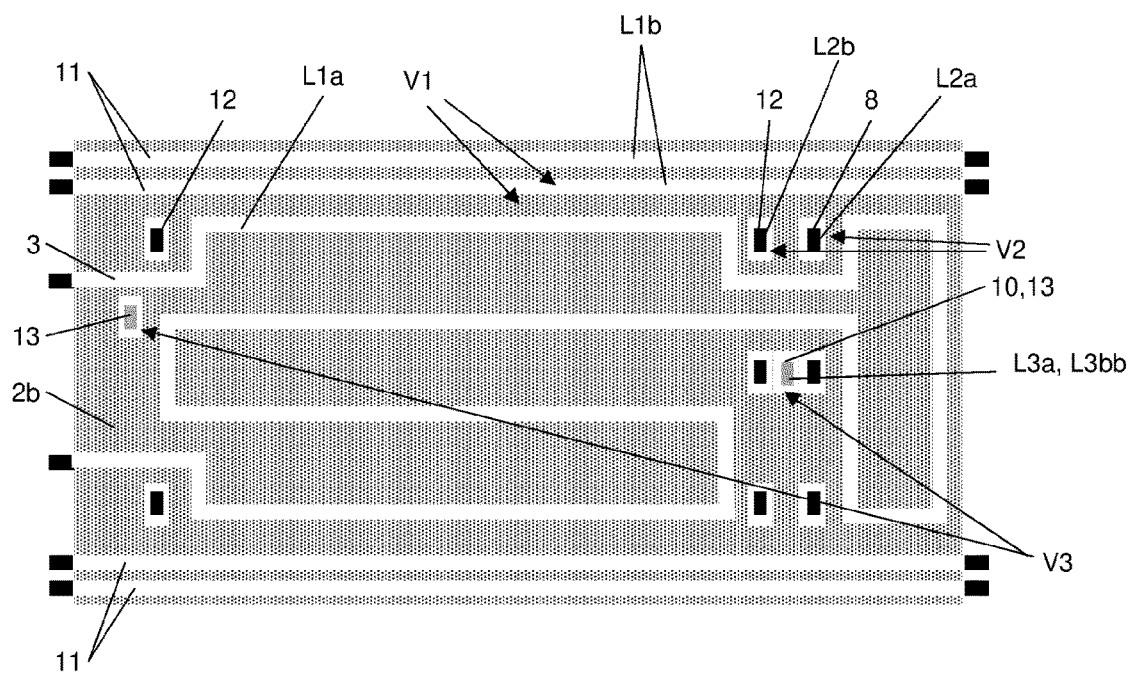
FIG. 2 shows a schematic longitudinal sectional illustration of a housing part of the electrical energy storage unit.

The second housing part 2b, which is shown in a longitudinal sectional illustration in FIG. 2, in this case has, in addition to the first interspace 3 for the temperature control of the electrical energy storage unit EES, further channel-like interspaces 11 that each have connections for fluid lines at the front and the rear end of the electrical energy storage unit EES. The interspaces 3, 11 in this case can be formed in the same plane or in different planes, for example, by a three-layered housing part 2b with two planes for cavities. The further interspaces 11 form first lines L1b, which are separate from the energy storage unit and transmit fluid, for transmitting materials, in particular fluids, for components, which are separate from the energy storage unit and are not shown here, wherein the lines L1b separate from the energy storage unit are integrated into the first distribution network V1 integrated into the electrical energy storage unit EES. By way of example, lines L1b of this kind can be coolant lines for a drive, refrigerant lines for a refrigerant circuit, brake lines, oil lines or the like, which are guided through the storage unit housing 1 between a front and a rear end of the electrical energy storage unit EES by means of the distribution network V1.

Figure 3:
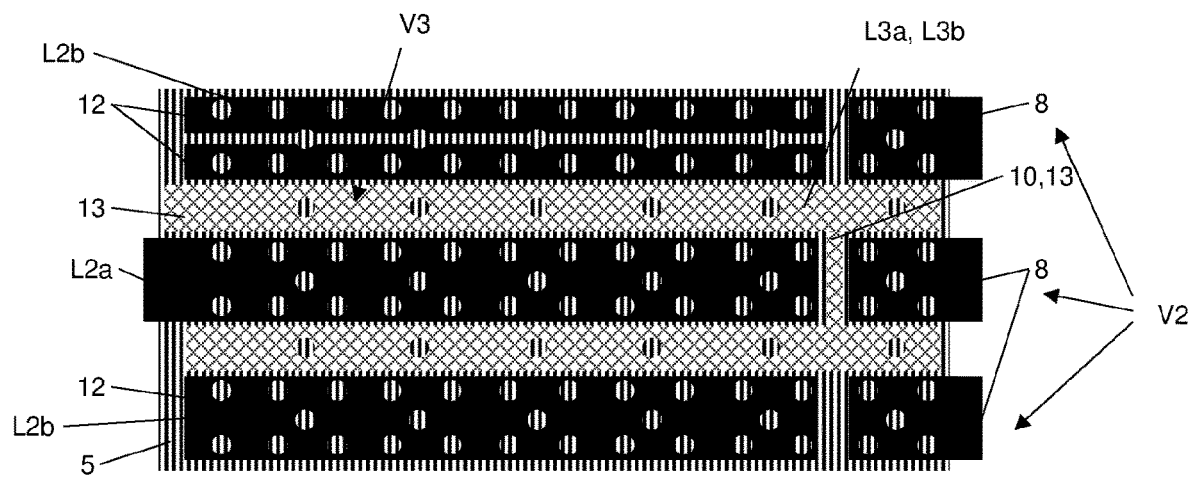
FIG. 3 shows a schematic longitudinal sectional illustration of a frame of the electrical energy storage unit.
Figure 4:
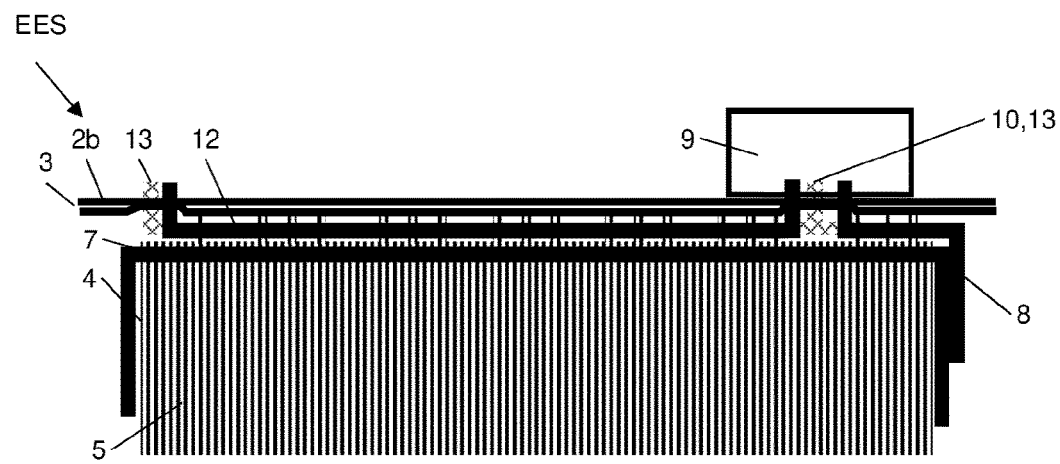
FIG. 4 shows a schematic sectional illustration from the side of a detail of the electrical energy storage unit.

Analogously to the power connections 8, in this case, as shown in a plan view of the frame 5 in FIG. 3 and in a cross-sectional illustration of a detail of the electrical energy storage unit EES in FIG. 4, further power connecting means 12 are arranged between the frame 5 and the second housing part 2b, which only include connections outside of the cell assembly 4. These power connections 12 are used to pass energy for the components separate from the energy storage unit, for example, the drive, a refrigerant compressor, a charging device, a vehicle on-board electrical system, or the like, between the front and the rear end of the electrical energy storage unit EES. The power connecting means 12 therefore form second lines L2*b*, which are separate from the energy storage unit, transmit energy, are integrated into the second distribution network V2 and are therefore guided through the storage unit housing 1.

Analogously to the sense connections 10, in this case further communication connecting means 13 are arranged between the frame 5 and the second housing part 2*b*, which only include connections outside of the cell assembly 4, and are used to pass communication signals for the components separate from the energy storage unit between the front and the rear end of the electrical energy storage unit EES. The communication connecting means 13 therefore form third lines L3*b*, which are separate from the energy storage unit, transmit information, are integrated into the third distribution network V3 and are therefore guided through the storage unit housing 1. By way of example, through-openings or connections can be provided in the second housing part 2*b*, as shown in FIG. 4, through which the lines L2*b*, L3*b* separate from the energy storage unit are guided out of the storage unit housing 1.

The sense connections 10 and further communication connecting means 13 can likewise be functionally integrated elements, for example, in the form of a recorded signal bus, on which the additional signals are coupled in at the outer connections. This signal bus is particularly advantageously in the form of a waveguide that includes the connections within the cell assembly 4 and the connections at the front and the rear end of the electrical energy storage unit EES. The lines L2*a*, L2*b*, L3*a*, L3*b* can also be integrated into the cell contacting system 7.

The invention claimed is:

1. An electrical energy storage apparatus for a motor vehicle, the electrical energy storage apparatus comprising:
 a plurality of components belonging to the electrical energy storage apparatus;
 a housing, on and/or in which the components belonging to the electrical energy storage apparatus are arranged; and
 a distribution network configured to distribute at least one of materials, energy and information, which is arranged in the housing and which has at least one line, which belongs to the electrical energy storage apparatus and is coupled to at least one of the components belonging to the electrical energy storage apparatus so as to transmit the at least one of the materials, the energy and the information;
 wherein the distribution network includes at least one line, separate from the electrical energy storage apparatus, for transmitting the at least one of the materials, the energy and the information between the components, which are separate from the electrical energy storage apparatus, of the motor vehicle outside of the housing;
 wherein the distribution network includes a communication network for transmitting information including monitoring signals or control signals;
 wherein the communication network is a waveguide that is configured to transmit acoustic and/or optical signals as the monitoring signals or the control signals; and
 wherein the waveguide is a single-piece molded part that has a solid body including first surface structures for signal in-coupling and signal out-coupling for the components belonging to the electrical energy storage apparatus, and second surface structures for signal in-coupling and signal out-coupling for the components separate from the electrical energy storage apparatus.

2. The electrical energy storage apparatus according to claim 1, wherein the housing includes at least two housing parts that terminate a housing interior for accommodating the components belonging to the electrical energy storage apparatus, wherein at least one of the housing parts is a multi-walled housing part and the distribution network is integrated into the multi-walled housing part.

3. The electrical energy storage apparatus according to claim 2, wherein the distribution network includes a fluid conduction system for distributing a fluid, and the multi-walled housing part has at least one first channel-like interspace through which the at least one line, which belongs to the electrical energy storage apparatus and conducts fluid, is formed, and at least one second channel-like interspace through which the at least one line, which is separate from the electrical energy storage apparatus and conducts fluid, is formed.

4. The electrical energy storage apparatus according to claim 1, wherein the distribution network includes a power network for energy transmission, wherein the power network is arranged in or on a cell module frame of the components, which belong to the electrical energy storage apparatus and are in the form of energy storage cells.

5. A motor vehicle comprising at least one electrical storage apparatus according to claim 1 and at least two components, which are separate from the electrical energy storage apparatus and are coupled by the at least one line, which is separate from the electrical energy storage apparatus and integrated into the distribution network.

* * * * *